(12) United States Patent
Kern et al.

(10) Patent No.: US 7,581,520 B2
(45) Date of Patent: Sep. 1, 2009

(54) PENCIL-TYPE GLOW PLUG HAVING AN INTEGRATED COMBUSTION CHAMBER PRESSURE SENSOR

(75) Inventors: Christoph Kern, Aspach (DE); Steffen Schott, Schwieberdingen (DE); Markus Ledermann, Asperg (DE); Pavlo Saltikov, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 11/794,462

(22) PCT Filed: Nov. 28, 2005

(86) PCT No.: PCT/EP2005/056254
§ 371 (c)(1),
(2), (4) Date: Apr. 3, 2008

(87) PCT Pub. No.: WO2006/072510
PCT Pub. Date: Jul. 13, 2006

(65) Prior Publication Data
US 2008/0302323 A1 Dec. 11, 2008

(30) Foreign Application Priority Data
Dec. 29, 2004 (DE) .................. 10 2004 063 750

(51) Int. Cl.
*G01L 23/10* (2006.01)
(52) U.S. Cl. .................. 123/145 A; 73/31.04; 73/31.05; 73/114.18; 73/35.13
(58) Field of Classification Search ............. 123/145 A; 73/35.12, 35.13, 31.04, 31.05, 114.18
See application file for complete search history.

(56) References Cited

U.S. PATENT DOCUMENTS

| 7,159,448 | B2 * | 1/2007 | Moelkner et al. .......... 73/35.12 |
| 2003/0091458 | A1 | 5/2003 | Weber et al. |
| 2005/0034525 | A1 * | 2/2005 | Moelkner et al. .............. 73/715 |
| 2007/0006641 | A1 * | 1/2007 | Wiedemann et al. .......... 73/115 |
| 2007/0295710 | A1 * | 12/2007 | Yamada et al. .............. 219/270 |
| 2008/0028841 | A1 * | 2/2008 | Ludwig et al. ................. 73/115 |
| 2008/0216786 | A1 * | 9/2008 | Ramond et al. ......... 123/143 A |
| 2008/0296281 | A1 * | 12/2008 | Glock et al. ................. 219/260 |
| 2009/0026889 | A1 * | 1/2009 | Wolfer et al. ............... 310/338 |
| 2009/0056660 | A1 * | 3/2009 | Goto et al. .............. 123/145 A |

FOREIGN PATENT DOCUMENTS

| DE | 656 168 | 1/1938 |
| DE | 102 18 544 | 11/2002 |

(Continued)

OTHER PUBLICATIONS

International Search Report, PCT International Patent Application No. PCT/EP2005/056254, dated Jun. 2, 2006.

*Primary Examiner*—Erick Solis
(74) *Attorney, Agent, or Firm*—Kenyon & Kenyon LLP

(57) ABSTRACT

A pencil-type glow plug for a self-igniting internal combustion engine is described. The pencil-type glow plug includes a plug body in which a combustion chamber pressure sensor is integrated, and a bar-shaped heating element that protrudes out from the plug body at one end, into the combustion chamber of the internal combustion engine. A force-measuring element of the combustion chamber pressure sensor is accommodated behind the heating element, which moves axially under the influence of force. The force-measuring element is sealed against combustion chamber gases by a steel diaphragm made of a stainless precipitation-hardened maraging steel.

11 Claims, 2 Drawing Sheets

FOREIGN PATENT DOCUMENTS

| | | |
|---|---|---|
| EP | 1 134 385 | 9/2001 |
| EP | 1 460 404 | 9/2004 |
| EP | 1 517 086 | 3/2005 |
| WO | WO 83/01093 | 3/1983 |
| WO | WO 97/31251 | 8/1997 |
| WO | WO 01/53556 | 7/2001 |

* cited by examiner

PENCIL-TYPE GLOW PLUG HAVING AN INTEGRATED COMBUSTION CHAMBER PRESSURE SENSOR

BACKGROUND INFORMATION

The exhaust gas laws that regulate pollutant emissions of self-igniting internal combustion engines are constantly becoming more stringent. In addition, newly developed engine management systems of internal combustion engines are subject to the requirement that they ensure low fuel consumption and longer lifespan. The optimization of the combustion in the combustion chamber of a self-igniting internal combustion engine is achieved through the use of controlled fuel injection. For this purpose, in an engine control unit based on a combustion chamber pressure signal, a pressure sensor is used that has to meet very high demands with regard to the achievable degree of reliability of the measurement precision, as well as an optimized combustion chamber.

Kraftfahrtechnisches Taschenbuch [Automotive Handbook], 23rd ed., Braunschweig; Wiesbaden, Vieweg 1999, ISBN 3-528-03876-4, page 111, describes an integrated silicon combustion chamber pressure sensor. The silicon combustion chamber pressure sensor includes a transmitting tappet, a silicon platform that is used for the introduction of force, and an integrated silicon pressure sensor. On one side of the steel assembly plate, there are situated one or more terminal pins, from which a connecting line runs to the integrated silicon pressure sensor. According to this system, the silicon chip is not immediately exposed to the high temperatures in a combustion chamber of an internal combustion engine. This is achieved using a metallic separating diaphragm, as well as a sufficiently long tappet for force transmission. Through the micromechanical attachment of a platform in the center of the diaphragm, the silicon chip is made into a force sensor. The pressure forces received by the front diaphragm are introduced into the sensor chip made of silicon via the tappet, with only slight adulteration by the platform. Said sensor chip is situated in an assembly position that is set back, and is thus exposed only to operating temperatures less than 150° C.

International Application WO 97/31251 A describes a combustion chamber pressure sensor for determining engine knock and misfires. A fiber-optic combustion chamber pressure sensor is integrated into a spark plug. This sensor is configured in such a way that the spark plug body is penetrated by a conductor. A diaphragm formed as a key having a nonuniform thickness reduces the mechanical stress acting on the diaphragm and increases the reliability of the sensor. Excess pressures acting on the combustion chamber pressure sensor are reduced through bent sections formed on the diaphragm.

International Application WO 01/53556 A1 describes a spring steel of the maraging type is known. This is a high-tensile, hardenable, corrosion-resistant spring steel made up essentially of 6.0 to 9.0% by weight Ni, 11.0 to 15.0% by weight Cr, 0.1 to 0.3% by weight Ti, and 0.2 to 0.3% by weight Be, the remainder being Fe, and whose martensite temperature $M_s$ is $\geqq 130°$ C., and having a ferrite content $C_{Ferrite} < 3\%$. In this high-tensile hardenable corrosion-resistant spring steel, up to 50% of the nickel content may be replaced by cobalt. Also, up to 35% of the chromium content may be replaced by molybdenum and/or tungsten.

A type of measurement device, currently widely available, for acquiring the combustion chamber pressure in the combustion chamber of an internal combustion engine is called a "stand-alone" sensor, for whose use a separate bore is provided in the cylinder head wall. Generally, the price of such sensors is fairly high, but this is regarded as justified by the high degree of measurement precision that can be achieved. For series production use in the automotive field, however, only comparatively low-cost pressure sensors make sense from the economic point of view. The integration of sensors into already-existing components of the cylinder head of an internal combustion engine achieves a significant price advantage, and in this way makes large-scale series production use possible. In cylinder heads of modern internal combustion engines, no additional bores are to be made, because the space conditions, in particular in four-valve internal combustion engines, are extremely restricted, and the course of coolant ducts is fixedly predetermined, causing the space in the cylinder head of an internal combustion engine to be extremely restricted.

SUMMARY

According to an example embodiment of the present invention, the pressure in the cylinders of a self-igniting internal combustion engine is determined using a combustion chamber pressure sensor integrated into a pencil-type glow plug. As a seal against the gases of the combustion chamber, a flexible diaphragm is used that is made of a stainless, precipitation-hardened maraging steel.

According to the example embodiment, a sensor is integrated into an already-present cylinder head component, such as a pencil-type glow plug. According to this embodiment, the seal is effected by a flexible element in the form of a diaphragm made of a stainless precipitation-hardened maraging steel. In comparison to other previously used materials, this steel has a high degree of strength, as well as a higher fatigue strength under reverse bending stress, or fatigue strength under fluctuating stresses, in comparison with normal and stainless steels. In addition, the stainless precipitation-hardened maraging steel has an increased fatigue strength, which positively influences the lifespan of the flexible diaphragm, and prevents to the greatest possible extent a failure of the seal at the combustion chamber of the internal combustion engine, due to the pencil-type glow plug protruding into this chamber, over the lifespan of the internal combustion engine.

In addition, the proposed material is distinguished by a high degree of aging stability. The high aging stability of this material is achieved by a thermal or mechanical pre-aging (pre-plasticizing). The thermal or mechanical pre-aging of the stainless, precipitation-hardened maraging steel makes it possible to achieve a low stress drop as well as an extremely favorable, i.e., low, relaxation behavior. Due to the outstanding isotropic deformability of the stainless precipitation-hardened maraging steel, the flexibly constructed diaphragm can be manufactured using the deep-drawing method. This method enables the formation of extremely thin-walled components that have only minimal bending radii. The proposed diaphragm made of a stainless precipitation-hardened maraging steel also has a favorable hysteresis characteristic and good high-temperature resistance. In addition, the stainless precipitation-hardened maraging steel is distinguished in that it has good chemical resistance to aggressive media, and in particular has an excellent resistance to hot gas corrosion, which is important in particular for use in internal combustion engines. From a manufacturing point of view, stainless precipitation-hardened maraging steels are characterized in that they permit good weldability, which is important with respect to creating the seal of the pencil-type glow plug, which has an integrated combustion chamber pressure sensor.

BRIEF DESCRIPTION OF THE DRAWINGS

The present invention is described in more detail on the basis of the figure.

DETAILED DESCRIPTION OF EXAMPLE EMBODIMENTS

Figure 1:
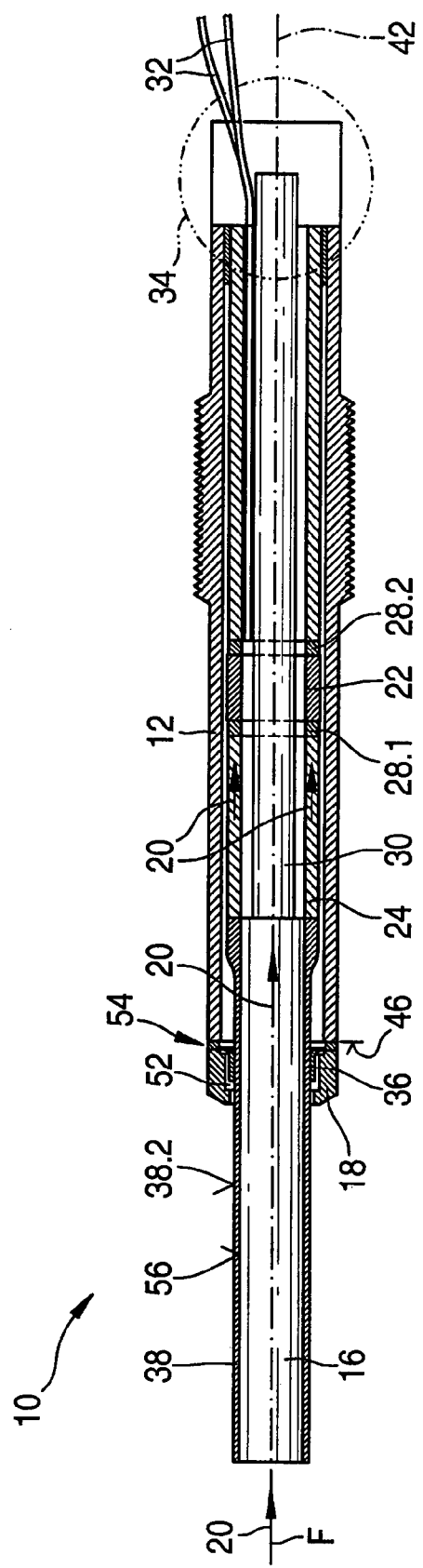
FIG. 1 shows a longitudinal section through the pencil-type glow plug proposed according to the present invention, with integrated combustion chamber pressure sensor and elastic steel diaphragm.

FIG. 1 shows an example embodiment of the pencil-type glow plug proposed according to the present invention having an integrated combustion chamber pressure sensor, in a sectional representation.

A pencil-type glow plug 10 has a plug body 12 that acts as a housing. Plug body 12 is generally tubular in construction and encloses a ceramic heating element 16 fashioned in the shape of a bar. The lateral surface of ceramic heating element 16 is identified by reference character 56. Bar-shaped ceramic heating element 16 protrudes at one end from plug body 12, and is sealed via a sealing cone 18. Because an annular gap is provided between ceramic or metallic heating element 16 and sealing cone 18, heating element 16 cannot be sealed. Sealing cone 18 ensures that the compression in the combustion chamber of the internal combustion engine is not reduced by leakage of combustion chamber gases in the area of the pencil-type glow plug bore.

At a clamping point 54, sealing cone 18 fixes a steel diaphragm 36 that represents the seal of pencil-type glow plug 10 against the combustion chamber gases. Bar-shaped ceramic heating element 16 protrudes into the combustion chamber of a self-igniting internal combustion engine, and is charged at one end surface by the gases, i.e., the gas pressure, prevailing in the combustion chamber. This is indicated in the representation according to FIG. 1 by the arrow designated F.

The gas pressure prevailing in the combustion chamber, which exerts a pressure force on the end surface of ceramic heating element 16, is conducted, according to a force path 20, through the material of ceramic heating element 16 to force transmission elements 24, and from there to a force-measuring element 22. Force-measuring element 22 can be both a piezoelectric sensor element and also a pressure measurement element.

On both sides of force-measuring element 22 charged by force transmitting elements 24, there are contactings; in the variant embodiment according to FIG. 1, these are a first contacting 28.1 and a second contacting 28.2. Force-measuring element 22 situated in force path 20 is preferably pre-stressed.

If force-measuring element 22 is a piezoelectric sensor element, then, given a mechanical stressing of this element through the exertion of a force impulse on the ceramic or metallic heating element 16, a charge and thus a voltage is produced that is picked off from the surfaces of force-measuring element 22 on the basis of a metallization and/or through the represented contactings 28.1 or 28.2. From force-measuring element 22, feeder lines 30 extend through the interior of plug body 12 of pencil-type glow plug 10, to a plug connector 34. Lines 32 are capable of being connected to plug connector 34, by which the electrical signals can be conducted to an evaluation unit, such as a central engine control device of an internal combustion engine.

Ceramic heating element 16 is surrounded by a supporting tube 38. The lateral surface of supporting tube 38 is identified by reference character 38.2. The main function of support tube 38 is the fastening of ceramic heating element 16, i.e., of the glow plug. Ceramic heating element 16 is soldered into support tube 38. Instead of a ceramic heating element 16, a heating element 16 made of metallic material may also be used. Ceramic heating element 16 and support tube 38 are fashioned symmetrical to axis of symmetry 42. Steel diaphragm 36 is fastened by sealing cone 18 to an end surface 46 of plug body 12. Sealing cone 18 limits a recess 52 inside which steel diaphragm 36, shown in bent form in FIG. 1, is accommodated.

A force F exerted by the pressure in the combustion chamber of an internal combustion engine acts on the end surface, protruding into the combustion chamber of the internal combustion engine, of bar-shaped ceramic heating element 16. The action of the force causes a linear-elastic spring deflection, in the range of $\mu m$, of the components situated in force path 20. This enables transmission of a force impulse that correlates directly with the combustion chamber pressure. Due to the effect of pressure on bar-shaped ceramic heating element 16 on its end surface, this heating element moves relative to steel diaphragm 6, fixed at clamping point 54. The pressure effect caused by the combustion chamber pressure on bar-shaped ceramic heating element 16 can on the one hand be transmitted immediately to force-measuring element 22, and on the other hand can be transmitted mediately via bar-shaped force transmission elements 24, fashioned in FIG. 1 between force-measuring element 22 and ceramic heating element 16.

Force-measuring element 22, which acts as a pressure sensor, is accommodated inside pencil-type glow plug 10, behind ceramic heating element 16, which moves in the combustion chamber due to the effect of pressure. The seal against the combustion chamber gases is effected by steel diaphragm 36, which is made of stainless, precipitation-hardened maraging steel.

Pressure sensors as used up to now in internal combustion engines are usually constructed in such a way that the surface of a steel diaphragm is exposed directly to the flame front in the combustion chamber. Modern manufacturing methods enable steel diaphragm 36 to be manufactured in various shapes and with various dimensions. The advantages of steel diaphragm 36 that is used, made of a stainless steel, compared to other previously used seals, include for example the high temperature resistance of steel diaphragm 36 from very low temperatures up to a temperature of +450° C., as well as their high degree of chemical resistance to almost all media. In addition, they have outstanding mechanical properties over the entire temperature range, as well as exceptional aging stability. Even at high process temperatures, sufficient endurance times can be achieved through the use of a corresponding type of steel.

Figure 2:
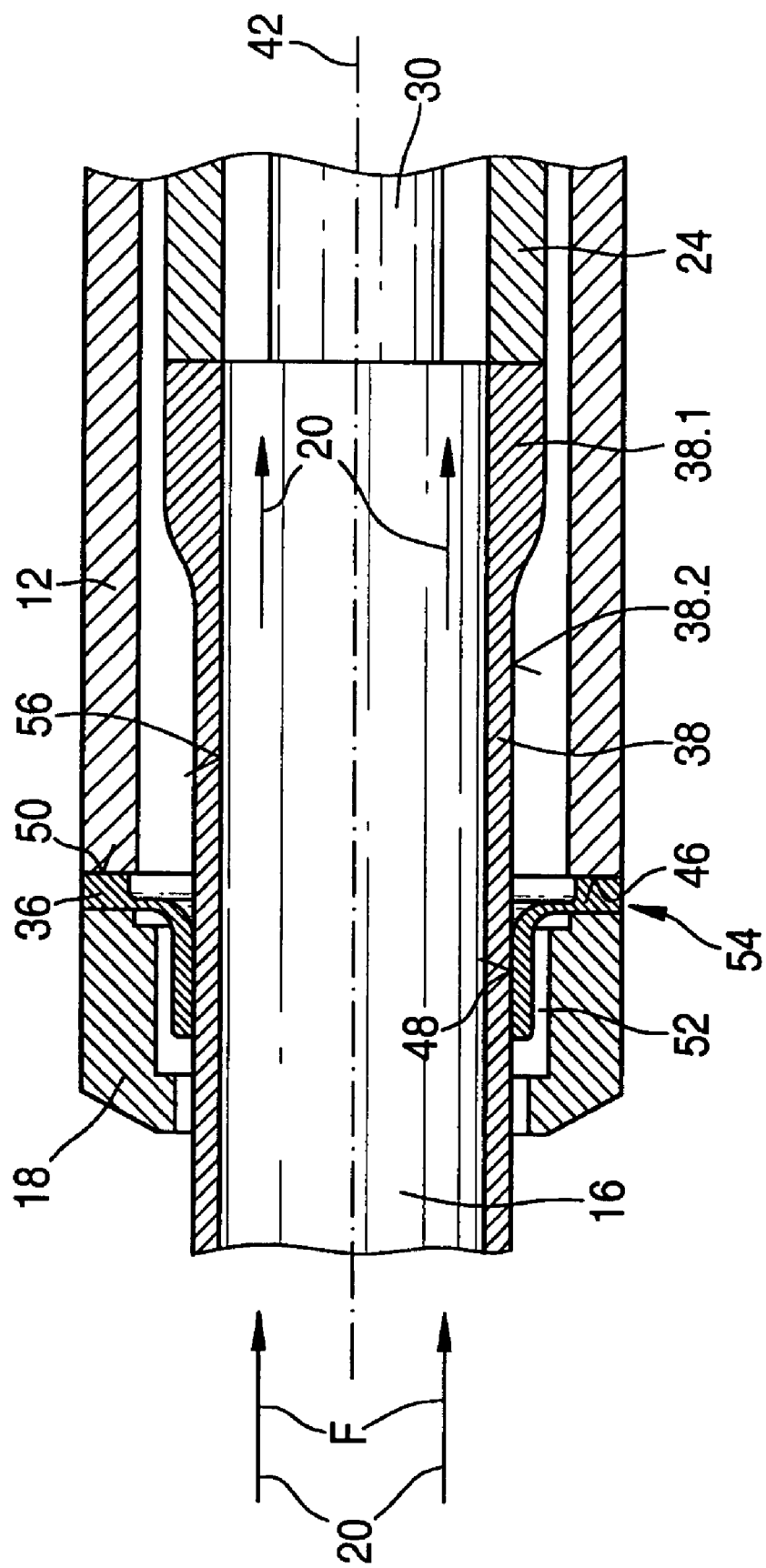
FIG. 2 shows, in an enlarged scale, the clamping point of the steel diaphragm.

The representation according to FIG. 2 shows the steel diaphragm that effects the seal, at its clamping point, in an enlarged scale.

FIG. 2 shows that steel diaphragm 36 is clamped between end surface 46 of plug body 12 and an end surface of sealing cone 18, at clamping point 54. Steel diaphragm 36 is situated with a first contact surface 48 on lateral surface 56 of ceramic heating element 16, which moves axially relative to the steel diaphragm when charged with pressure, and with a second contact surface 50 opposite end surface 46 of plug body 12. The axial movement of bar-shaped ceramic heating element 16 takes place through force F, indicated by arrows, which is exerted via the pressure to be determined prevailing in the combustion chamber on ceramic heating element 16, which extends into the combustion chamber of the internal combustion engine. In FIG. 2, the force path is also indicated by reference character 20. In the representation shown in FIG. 2, behind ceramic heating element 16 there is situated a connecting bolt 30 that acts as a glow current rail. The sensor lines with which the electrical signal from the sensor is picked off should be insulated from the glow current. Therefore, a contact sheet or the like of force-transmitting element 22 is not permitted to contact the glow current rail or ceramic heating element 16 is not permitted. Force-transmitting element 24, shown in FIG. 2 and supported in a collar 38.1 of support tube 38, is made of an insulating material, such as insulating ceramic. For the case in which force-transmitting element 22 is to be situated immediately behind ceramic or metallic heating element 16, at least one insulating disk can be used instead of a ceramic force-transmitting element 24. Collar 38.1 fashioned on support tube 38 is used to transmit force to force-measuring element 22 via force-transmitting elements 24.

Steel diaphragm 36 has excellent spring properties. Steel diaphragm 36 can for example be connected to first contact surface 48 on the periphery of its inner diameter, for example with support tube 38, in which ceramic heating element 16 is housed. If, in contrast, heating element 16 is made of a metallic material, a direct connection of steel diaphragm 36 to the lateral surface of a heating element 16 fashioned in this way is possible. Alternatively, it is also possible to connect steel diaphragm 36 to a support tube 38, made for example of steel.

Another fastening possibility for steel diaphragm 36 can be realized between end surface 46 of plug body 12 and second contact surface 50 of steel diaphragm 36. In addition, it is also possible to manufacture steel diaphragm 36 so as to be for example integrally joined to sealing cone 18 or to plug body 12, for example using laser welding.

According to an example embodiment of the present invention, a steel diaphragm 36 is used in a pencil-type glow plug 10 having an integrated combustion chamber pressure sensor, steel diaphragm 36 being made of a high-tensile stainless precipitation-hardened maraging steel. This steel has a chromium content between 11.0% by weight to 15.0% by weight, a nickel content of 6.0% by weight to 9.0% by weight, a titanium content between 0.1% by weight and 0.3% by weight, and a beryllium content of 0.2% by weight to 0.3% by weight, the rest being iron. The martensite temperature $M_s$ is $\geq 130°$ C., and the ferrite content $C_{ferrite}$ is <3%. In the solution-annealed state, this steel is a completely martensitic alloy, and has a corresponding crystal structure that permits good isotropic plasticity. The solution-annealed state is characterized by the deposition of intermetallic phases within a metal matrix. This state arises in a material-specific manner.

This material can be hardened using a thermal treatment. The hardening of these steels achieves very high strengths, high fatigue strength under reverse bending, and relaxation tolerance up to 300° C. After a corresponding thermal treatment, Vickers hardnesses HV>590 and very high strengths (>1900 MPa) can be achieved. 50% by weight of the nickel content can be replaced by the addition of cobalt, and up to 35% by weight of the chromium content can be replaced through the addition of molybdenum and/or tungsten. In addition, this steel can contain up to 4% by weight copper, which can further increase its already outstanding corrosion resistance. In addition, a steel diaphragm 36 made from this steel can be welded very well at clamping point 54 according to the representation in FIG. 2, so that an integral bond created by welding can be formed on the one hand at end surface 46 of plug body 12 and on the other hand an integral bond can be created between steel diaphragm 36 and sealing cone 18. Good weldability may be an important criterion for simple assembly of steel diaphragm 36 during manufacturing.

The steel material of steel diaphragm 36 has a tensile strength $R_m$>2000 MPa, as well as a yield stress of $R_{p0.2}$>1900 MPa, as well as a fatigue strength under reverse bending $R_{BW}$>900 MPa, as well as a fatigue strength under fluctuating stress $R_s$>1500 MPa. Thus, steel diaphragm 36 can be brought into the shape shown in FIG. 1, for example through deep-drawing or some other manufacturing method, while retaining after this shaping the outstanding elastic properties of the material of steel diaphragm 36. Of course, in addition to the configuration of steel diaphragm 36 shown in FIG. 1, other shapes are possible that are not shown. After the shaping of steel diaphragm 36, this diaphragm can also be additionally specifically hardened using a defined thermal treatment. The material used for the steel diaphragm is distinguished by its excellent fatigue strength under reverse bending. There are steels that have higher strengths than does the material (maraging steel) preferably used for steel diaphragm 36, but their maximum endurance under cyclical alternating stress is very limited. In addition to the already mentioned deep-drawing process, steel diaphragm 36 can also be manufactured using cutting methods.

In addition, the steel material is very resistant to aggressive media, such as the combustion chamber gases found in an internal combustion engine. In addition, it is to be noted that the material can withstand even the highest temperatures over long periods of time, so that the sealing of pencil-type glow plug 10, in which the combustion chamber pressure sensor, having the components bar-shaped heating element 11 and force-measuring element 22 contacted at one or both sides, and possibly force-transmitting elements 24 extending through plug body 12, is permanently sealed against the combustion chamber gases, which significantly prolongs the lifespan of pencil-type glow plug 10 proposed according to the present invention.

The material from which steel diaphragm 36 is preferably manufactured is distinguished by very good plasticity. In general, martensitic steels have very high hardnesses, and therefore have very poor plasticity. The present material, from which steel diaphragm 36 is preferably manufactured, is indeed a martensitic alloy, but nonetheless has very good plasticity. The material from which steel diaphragm 36 is preferably manufactured is the mentioned maraging steel, having the composition also described above. This material has a tensile strength $R_m$>2000 MPa, a yield stress $R_{p0.2}$>1900 MPa, and a Vickers hardness HV >600.

What is claimed is:

1. A pencil-type glow plug for a self-igniting internal combustion engine, comprising:
    a plug body in which a combustion chamber pressure sensor is integrated;
    a bar-shaped heating element that protrudes out at one end from the plug body and protrudes into a combustion chamber of the internal combustion engine; and
    a force-measuring element of the combustion chamber pressure sensor accommodated behind the heating element, which is capable of axial movement when acted on by pressure, the force-measuring element being sealed against combustion chamber gases by a steel diaphragm made of stainless precipitation-hardened maraging steel.

2. The pencil-type glow plug as recited in claim 1, wherein the steel diaphragm is accommodated at a combustion chamber-side end of the plug body, between a sealing cone and the plug body.

3. The pencil-type glow plug as recited in claim 1, wherein the steel diaphragm is connected at a clamping point either to the plug body or to the bar-shaped heating element.

4. The pencil-type glow plug as recited in claim 3, wherein the steel diaphragm is integrally joined to an end surface of the plug body or to an end surface of a sealing cone.

5. The pencil-type glow plug as recited in claim 3, wherein the steel diaphragm is manufactured from a steel having the following composition:
- 11.0% by weight to 15.0% by weight Cr,
- 6.0% by weight to 9.0% by weight Ni,
- 0.1% by weight to 0.3% by weight Ti,
- 0.1% by weight to 0.3% by weight Be,
- 0.5% by weight to 1.5% by weight Mo,
- remainder iron.

6. The pencil type glow plug as recited in claim 5, wherein the steel of the steel diaphragm contains up to 4% by weight Cu.

7. The pencil-type glow plug as recited in claim 5, wherein up to 50% of the Ni content is replaced by cobalt.

8. The pencil-type glow plug as recited in claim 5, wherein up to 35% of the Cr content is replaced by at least one of molybdenum and/or tungsten.

9. The pencil-type glow plug as recited in claim 1, wherein the steel diaphragm is connected at the periphery of an inner diameter to a lateral surface of the bar-shaped heating element at a first contact surface.

10. The pencil-type glow plug as recited in claim 1, wherein the bar-shaped heating element is fastened in a support tube.

11. A combustion chamber pressure sensor for acquiring the pressure in a combustion chamber of an internal combustion engine, the sensor including a steel diaphragm that shields a force-measuring element against combustion chamber gases, the steel diaphragm being manufactured from a steel having the following composition:
- 11.0% by weight to 15.0% by weight Cr,
- 6.0% by weight to 9.0% by weight Ni,
- 0.1% by weight to 0.3% by weight Ti,
- 0.1% by weight to 0.3% by weight Be,
- 0.5% by weight to 1.5% by weight Mo,
- remainder iron.

* * * * *